(12) United States Patent
Thompson

(10) Patent No.: US 11,295,562 B2
(45) Date of Patent: Apr. 5, 2022

(54) STAGED TROUBLESHOOTING AND REPAIR OF VEHICLE ELECTROMECHANICAL COMPONENTS

(71) Applicant: TOYOTA MOTOR ENGINEERING & MANUFACTURING NORTH AMERICA, INC., Plano, TX (US)

(72) Inventor: Derek A. Thompson, Ypsilanti, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 287 days.

(21) Appl. No.: 16/360,766

(22) Filed: Mar. 21, 2019

(65) Prior Publication Data

US 2020/0302713 A1 Sep. 24, 2020

(51) Int. Cl.
*G07C 5/08* (2006.01)
*B60S 5/00* (2006.01)

(52) U.S. Cl.
CPC .............. *G07C 5/0816* (2013.01); *B60S 5/00* (2013.01); *G07C 5/0808* (2013.01)

(58) Field of Classification Search
CPC ........ G07C 5/0816; G07C 5/0808; B60S 5/00
See application file for complete search history.

(56) References Cited

U.S. PATENT DOCUMENTS

| | | | |
|---|---|---|---|
| 6,678,591 B2 | 1/2004 | Ohmura et al. | |
| 7,788,003 B2 | 8/2010 | Yamada et al. | |
| 8,726,188 B2 | 5/2014 | Tan | |
| 9,472,028 B2 | 10/2016 | Abdel-Rahman et al. | |
| 2003/0109972 A1* | 6/2003 | Tak .................. | G06Q 10/02 701/31.4 |
| 2014/0288761 A1 | 9/2014 | Butler et al. | |
| 2019/0197798 A1* | 6/2019 | Abari ................ | G06Q 10/02 |
| 2020/0009809 A1* | 1/2020 | Hong ................ | B60S 5/046 |

FOREIGN PATENT DOCUMENTS

| | | |
|---|---|---|
| CN | 204857043 U | 12/2015 |
| EP | 1205883 A1 | 5/2002 |

\* cited by examiner

*Primary Examiner* — Michael V Kerrigan
(74) *Attorney, Agent, or Firm* — Haynes and Boone, LLP

(57) ABSTRACT

A vehicle includes an automotive staged diagnostic system including: one or more components of the vehicle, a user interface, and a control unit configured to receive a signal identifying at least one malfunctioning component of the vehicle. The system may automatically identify a diagnostic procedure for the malfunctioning component from a plurality of diagnostic procedures, initiate and execute the steps of the identified diagnostic procedure by: soliciting information from a user, issuing instructions to the user, executing branching logic steps, and checking electrical pathways upstream and downstream of the malfunctioning component. The control unit is further configured to initiate repair or replacement of the malfunctioning component based on a user action received via the user interface, and recommend service options if the diagnostic procedure is unable to return the malfunctioning component to working order.

20 Claims, 7 Drawing Sheets

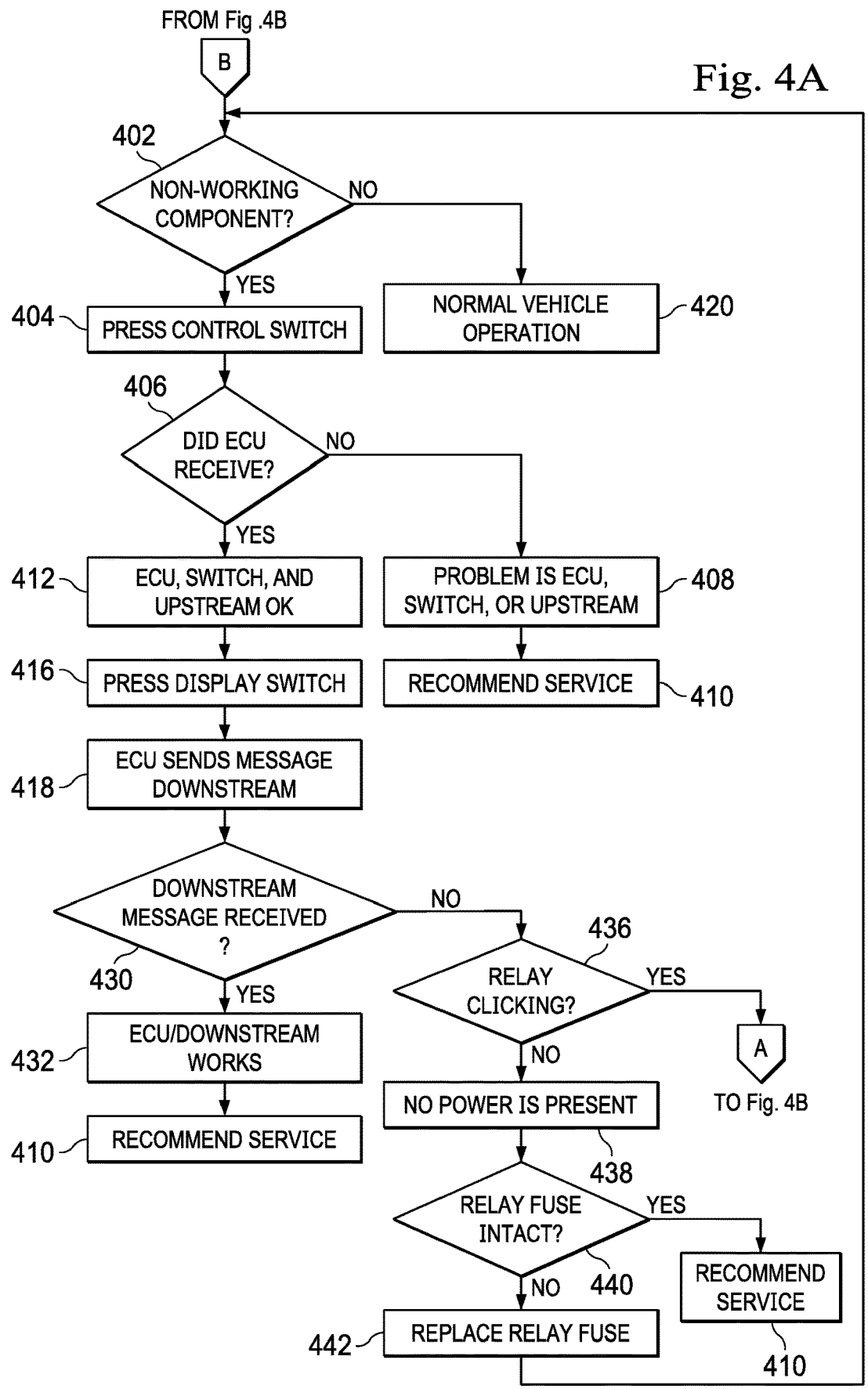

STAGED TROUBLESHOOTING AND REPAIR OF VEHICLE ELECTROMECHANICAL COMPONENTS

TECHNICAL FIELD

The subject matter described herein relates generally to enabling vehicles to guide users through step-by-step troubleshooting and repair of apparently malfunctioning vehicle components. This method has particular but not exclusive utility for consumer and commercial cars and trucks with electronic and electromechanical accessories and components.

BACKGROUND

Modern vehicles include complex electronic and electromechanical accessories, components, and subsystems, including power seats, seatbelts, sunroofs, sun shades, running boards, fold-out mirrors, mirror heaters, and others. Due to their complexities, such components, accessories, and subsystems can be subject to breakdown and malfunction.

Troubleshooting a vehicle electrical component can be a daunting task with many unknowns. For example, if a power sunroof freezes during the winter time, attempting to open the sunroof may cause the sunroof to time out, overheat and damage the solenoid/motor, or cause a fuse to burn out. Troubleshooting could reveal problems with a number of possible causes. Further, tasks as seemingly simple as checking a fuse may be quite daunting, as many modern vehicles have three or more fuse boxes located throughout the vehicle (e.g., engine compartment, under the instrument panel next to the driver seat, inside the instrument panel, behind the glove box, next to the battery, in the trunk, etc.). Then after identifying the correct fuse and the correct fuse box location, a user often has to dismantle various vehicle components to access the fuse box and use a specialty tool to replace the fuse. Even after this is done, the problem may still persist. The user may then have to take the vehicle to a service station, despite an investment of substantial time and effort attempting to correct the problem at home.

For these and other reasons, self-directed repair attempts may present numerous unaddressed challenges in the art. Accordingly, long-felt needs exist for diagnostic and repair systems that address the forgoing or other concerns.

The information included in this Background section of the specification is included for technical reference purposes only and is not to be regarded as subject matter by which the scope of the disclosure is to be bound.

SUMMARY

Disclosed are apparatus, systems, and methods that may enable vehicles to assist users with troubleshooting and repair of apparently malfunctioning automotive components or vehicle components. The apparatus, systems, and methods are henceforth referred to collectively as a "staged diagnostic system." The staged diagnostic system may detect faults and recommend specific actions to the user or vehicle owner, in order to isolate (and in some instances, repair) the fault.

In some implementations, the system includes one or more components of the vehicle, a user interface, and a control unit configured to: receive a signal identifying at least one malfunctioning component of the one or more components of the vehicle, automatically identify a diagnostic procedure for at least one malfunctioning component from a plurality of diagnostic procedures, initiate the identified diagnostic procedure, and execute the steps of the diagnostic procedure by: soliciting information from a user via the user interface, issuing instructions to the user via the user interface, executing branching logic steps, and checking electrical pathways upstream and downstream of the malfunctioning component. The control unit is further configured to initiate repair or replacement of the malfunctioning component based on a user action received via the user interface, and recommend service options via the user interface to the user if the diagnostic procedure is unable to return the malfunctioning component to working order.

A system of one or more control units can be configured to perform particular operations or actions by virtue of having software, firmware, hardware, or a combination of them installed on the system that in operation causes or cause the system to perform the actions. One or more branching diagnostic procedures or fault trees can be configured to perform particular operations or actions by virtue of including instructions that, when executed by data processing apparatus, cause the apparatus to perform the actions. Other embodiments of this aspect include corresponding computer systems, apparatus, and computer programs recorded on one or more computer storage devices, each configured to perform the actions of the methods.

Implementations may include one or more of the following features. Soliciting information from the user or issuing instructions to the user involves a voice interface. Soliciting information from the user or issuing instructions to the user involves a visual interface. Soliciting information from the user or issuing instructions to the user involves a dashboard head unit. Soliciting information from the user or issuing instructions to the user involves a portable device. The portable device includes an augmented reality device and the instructions to the user include augmented reality instructions. The at least one malfunctioning component includes an electromechanical component. The at least one malfunctioning component includes an electronic component. The instructions to the user include activating controls within the vehicle. The instructions to the user include activating controls within the automotive staged diagnostic system. The instructions to the user include physical examination of vehicle subcomponents. The instructions to the user include physical replacement of vehicle subcomponents. Implementations of the described techniques may include hardware, a method or process, or control unit software, procedures, or fault trees on a control-unit-accessible medium.

One general aspect includes a method for returning malfunctioning automotive components to working condition, the method including: receiving a status of at least one malfunctioning component of one or more vehicle components by receiving a signal from a user via a user interface, identifying a diagnostic procedure that relates to the at least one malfunctioning component stored in a memory from a plurality of diagnostic procedures stored in the memory, executing branching logic steps of the identified diagnostic procedure for the at least one malfunctioning component, soliciting information from the user about the at least one malfunctioning component via the user interface, issuing instructions to the user regarding the at least one malfunctioning component via the user interface, and checking electrical pathways upstream and downstream of the at least one malfunctioning component. The method also includes if, at an endpoint of the diagnostic procedure, the at least one malfunctioning component continues to malfunction, recommending service options to the user. Other embodiments of this aspect include corresponding control units, apparatus, and software or diagnostic procedures recorded on one or more storage devices, each configured to perform the actions of the methods.

Implementations may include one or more of the following features. The method where soliciting information from or issuing instructions to the user involves a voice interface. The method where soliciting information from the user or issuing instructions to the user involves a visual interface. The method where soliciting information from the user or issuing instructions to the user involves a dashboard head unit. The method where soliciting information from the user or issuing instructions to the user involves a portable device. The method where the portable device includes an augmented reality device. The method where the at least one malfunctioning component includes an electronic or electromechanical component. Implementations of the described techniques may include hardware, a method or process, or control unit software, branched diagnostic procedures, or fault trees on a control-unit-accessible medium.

One general aspect includes a vehicle staged diagnostic module including a user interface and a processor configured to: receive a signal indicative of a status of a malfunctioning component of a vehicle, automatically identify a diagnostic procedure for the malfunctioning component from a plurality of diagnostic procedures and initiate the identified diagnostic procedure, execute branched logic paths of the identified diagnostic procedure, solicit information from a user via the user interface regarding the malfunctioning component, issue instructions to the user regarding the malfunctioning component via the user interface, initiate tests of electrical pathways upstream or downstream of the malfunctioning, and recommend service options to the user via the user interface if an endpoint of the identified diagnostic procedure indicates a continued malfunction status of at least one component of the malfunctioning component. Other embodiments of this aspect include corresponding control units, apparatus, and branching logic steps recorded on one or more control-unit-accessible storage devices, each configured to perform the actions of the methods.

The staged diagnostic system disclosed herein has particular, but not exclusive, utility for consumer and commercial vehicles, that may include cars and trucks with electronic and electromechanical accessories and components.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the method, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIGS. 4A and 4B are flow diagrams showing exemplary process steps undertaken by a staged diagnostic system according to at least one embodiment of the present disclosure.

DETAILED DESCRIPTION

Figure 1:
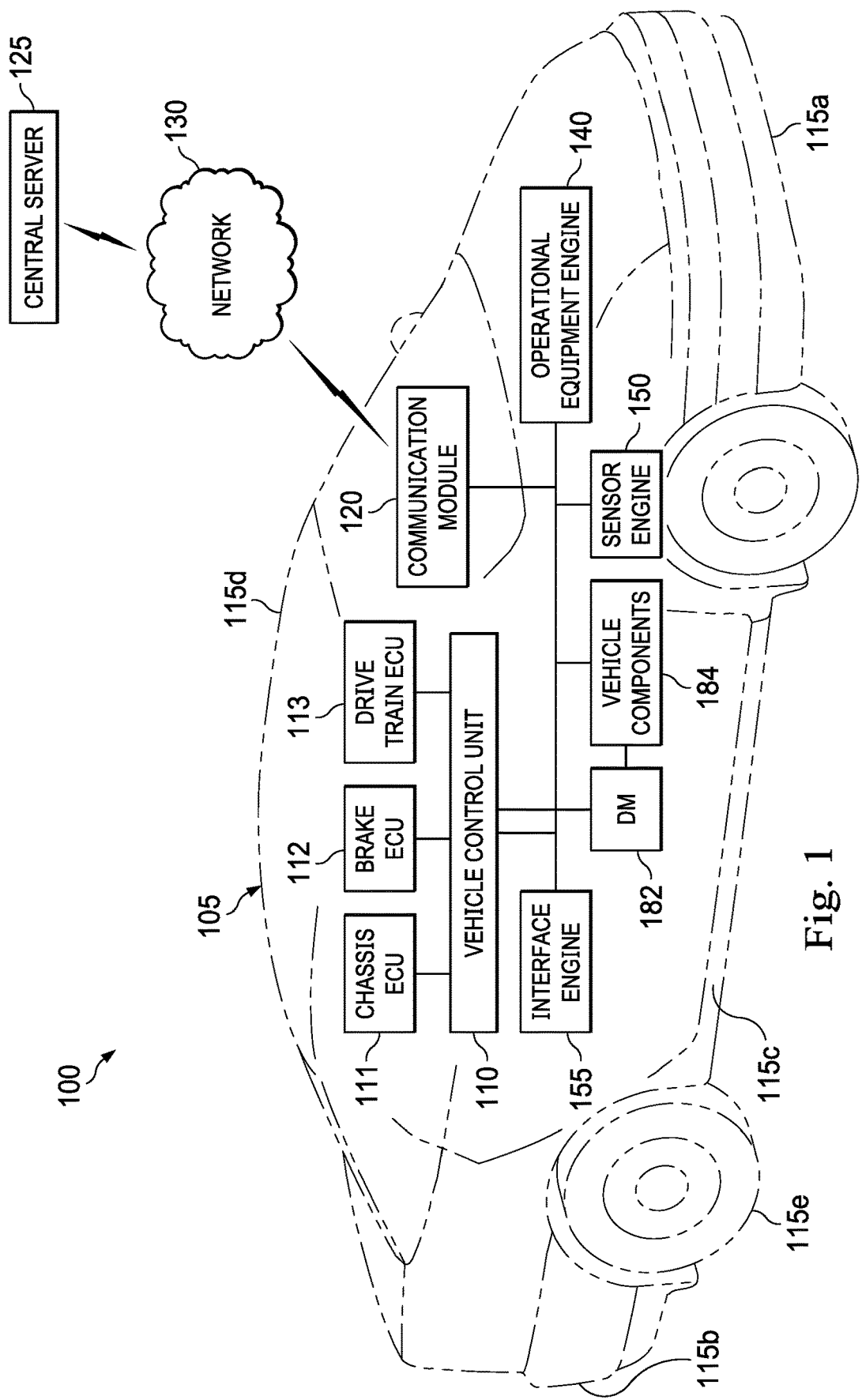
FIG. 1 is a diagrammatic illustration of a vehicle including a staged diagnostic system, in accordance with at least one embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Often, when diagnosing faults in automotive accessories, components, or subsystems, vehicle owners are unaware of the possible causes or the steps required to isolate them. The staged diagnostic system of the present disclosure may provide a simple, convenient, and cost-effective method to aid a user in troubleshooting problems that occur when a power system malfunctions (e.g., power running boards, power windows, sunroof, power extend mirrors, auto fold side view mirrors, power seats, power sun shades, etc.). In some embodiments, the staged diagnostic system begins troubleshooting the problem by asking a series of questions starting with questions relating to the most likely or most easily identifiable cause down to the most complex issues that may require a service technician. In some embodiments, the staged diagnostic system provides such instructions through a user interface in the form of an interactive voice interface or touchscreen wherein instructions may be given through any combination of audio, visual interface (e.g., images, text, symbols), or video playback or streaming from an onboard database, or through a wireless network or server connection, or cloud storage device.

In some exemplary embodiments, using an API on a smartphone, onboard monitor, or other electronic device, the staged diagnostic system provides a branched diagnostic procedure that walks a user through one or more steps to inspect for symptoms (to further diagnose the problem) or one or more steps to repair the problem. After each step the system may ask the user to confirm whether the issue was resolved or whether a specific action had occurred (e.g., LED flashed green or motor whirred indicating power was supplied). In an example, once positive or negative confirmation is given, the system may complete the troubleshooting or move to a next possible cause and remedy until the issue is resolved. This will help the user isolate the issue, and for each point of occurrence, if resolution criteria are not met, the system may provide locations for parts to be swapped, instructions on how to swap them, and the ability to check part inventory at nearby dealerships. Some issues may require service with sophisticated equipment by a professional technician, and in these cases, the staged diagnostic system may identify that such service is necessary and recommend it to the user.

The present disclosure may aid substantially in automotive component fault correction, by improving the ability of vehicles to overcome certain malfunctions in an automated manner, without the need for professional service or complex actions undertaken by a vehicle owner. Implemented on a processor in communication with a sensor associated with the malfunctioning component, the staged diagnostic system disclosed herein may provide practical self-diagnosis and self-repair capabilities to motor vehicles. This streamlined and augmented diagnostic and repair capability may transform a non-functioning vehicle component into a functioning one, without the normally routine need for a user to read manuals, follow written procedures, put the vehicle into a "manufacturer mode", or be familiar with manufacturer-specific and model-specific fault trees. This unconventional approach may improve the functioning and uptime of the vehicle while reducing cost of ownership, by automatically restoring malfunctioning vehicle components to working condition.

The staged diagnostic system may comprise a subroutine that includes a user interface, such as a display, and operated by a control process executing on a processor that may accept user inputs from a voice, gesture, or touchscreen interface, and that is in communication with one or more sensors and one or more actuators. In that regard, the control process may perform certain specific operations in response to different conditions, including but not limited to sensor readings and user inputs. Certain structures, functions, and operations of the processor, display, sensors, and user input systems are known in the art, while others are recited herein to enable novel features or aspects of the present disclosure with particularity.

These descriptions are provided for exemplary purposes, and should not be considered to limit the scope of the staged diagnostic system. Certain features may be added, removed, or modified without departing from the spirit of the claimed subject matter.

FIG. 1 is a diagrammatic illustration of a vehicle including a staged diagnostic system, in accordance with at least one embodiment of the present disclosure. In an example, the staged diagnostic system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, scheduling, SMS, and email.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140, as will be described in further detail below. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to control at least partially the interaction of data with and between the various components of the staged diagnostic system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, and a drive train ECU 113 (variously known as an engine ECU, power plant ECU, or motor ECU) that controls elements of the motor and drivetrain. A reader of ordinary skill in the art will understand that other components or arrangements of components may be found in a vehicle 105, and that the same general principles apply to electric vehicles, internal combustion vehicles, and hybrid vehicles.

In some embodiments, the staged diagnostic system 100 further includes a diagnostic module (DM) 182 in communication with vehicle components 184.

Figure 2:
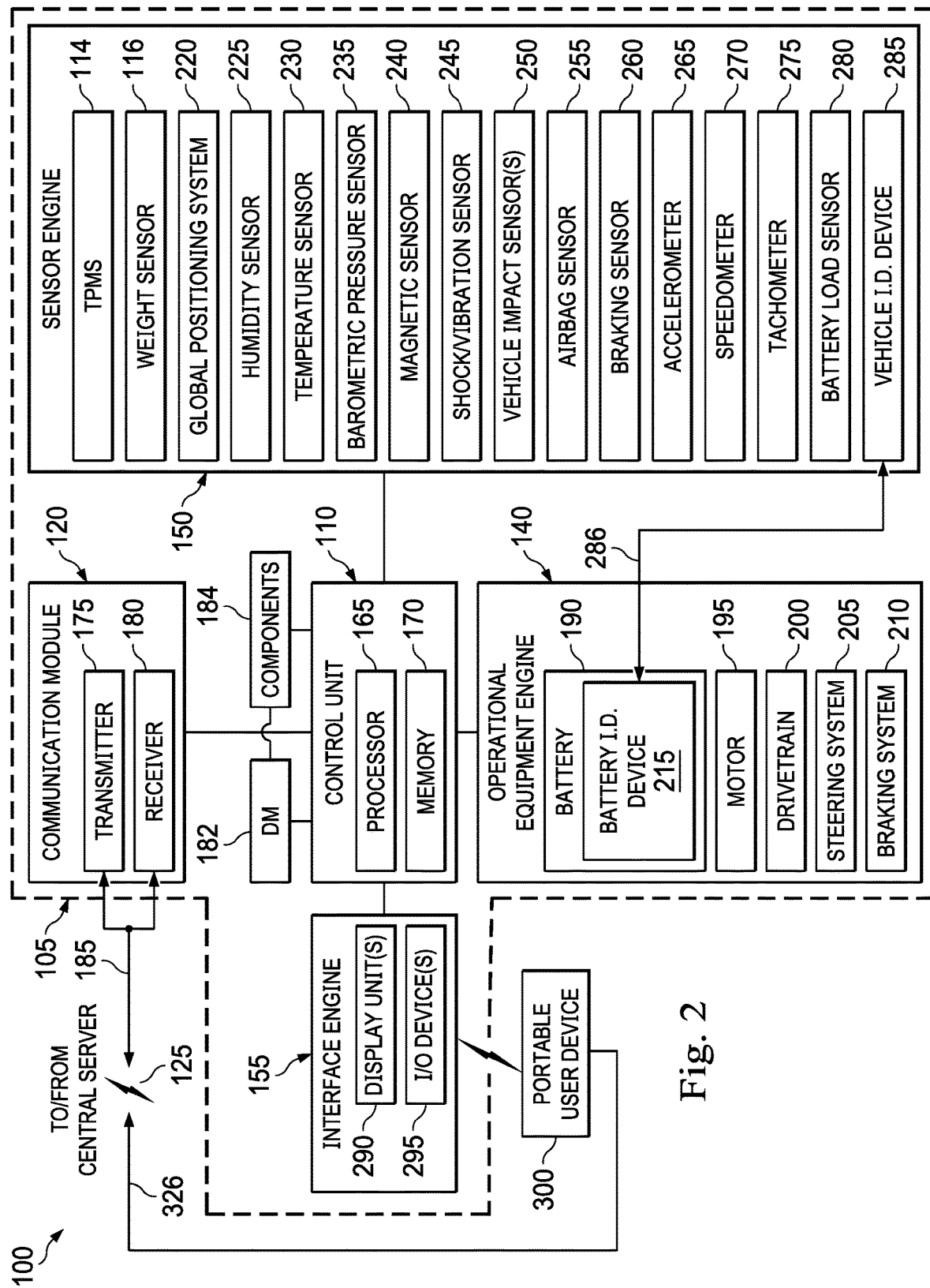
FIG. 2 is a block diagram including several components of the staged diagnostic system of FIG. 1, in accordance with at least one embodiment of the present disclosure.

FIG. 2 is a block diagram including several components of the staged diagnostic system of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In an example, the vehicle battery 190 provides electrical power to the motor 195 to drive the wheels 115e of the vehicle 105 via the drivetrain 200. In some examples, in addition to providing power to the motor 195 to drive the wheels 115e of the vehicle 105 via the drivetrain 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like.

In some examples, the sensor engine 150, which is operably coupled to, and adapted to be in communication with, the vehicle control unit 110, includes devices such as sensors, meters, detectors, or other devices configured to measure or sense a parameter related to a driving operation or other operation of the vehicle 105. For example, the sensor engine 150 may include a global positioning system 220, a humidity sensor 225, a temperature sensor 230, a barometric pressure sensor 235, a magnetic sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a TPMS 114, a weight sensor 116, or any combination thereof. The sensors or other detection devices may be configured to sense or detect activity, conditions, and circumstances in an area to which the device has access, e.g., ambient conditions or conditions within a battery compartment. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 operated by an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried onto the vehicle 105 by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

In some embodiments, the staged diagnostic system 100 further includes a diagnostic module (DM) 182. The DM 182 may be a software module, a hardware module (e.g., a processor or control unit), a firmware module, or any combination thereof, and may be a standalone module or may be integrated into other vehicle components such as the VCU 110 or Sensor Engine 150, or an electronic control unit (ECU) associated with a component (see FIG. 3). In these embodiments, the DM is in communication with vehicle components 184, either by receiving data from sensors associated with each component 184 (e.g., linear encoders, rotary encoders, voltage sensors, or current sensors), by receiving data from status variables associated with each component (e.g., status bits, status bytes, status words, or error codes), or by exchanging other data with an ECU or VCU associated with the component 184.

A reader of ordinary skill in the art will understand that other components or arrangements of components may be found in a vehicle 105, and that the same general principles apply to electric vehicles, internal combustion vehicles, and hybrid vehicles.

Figure 3:
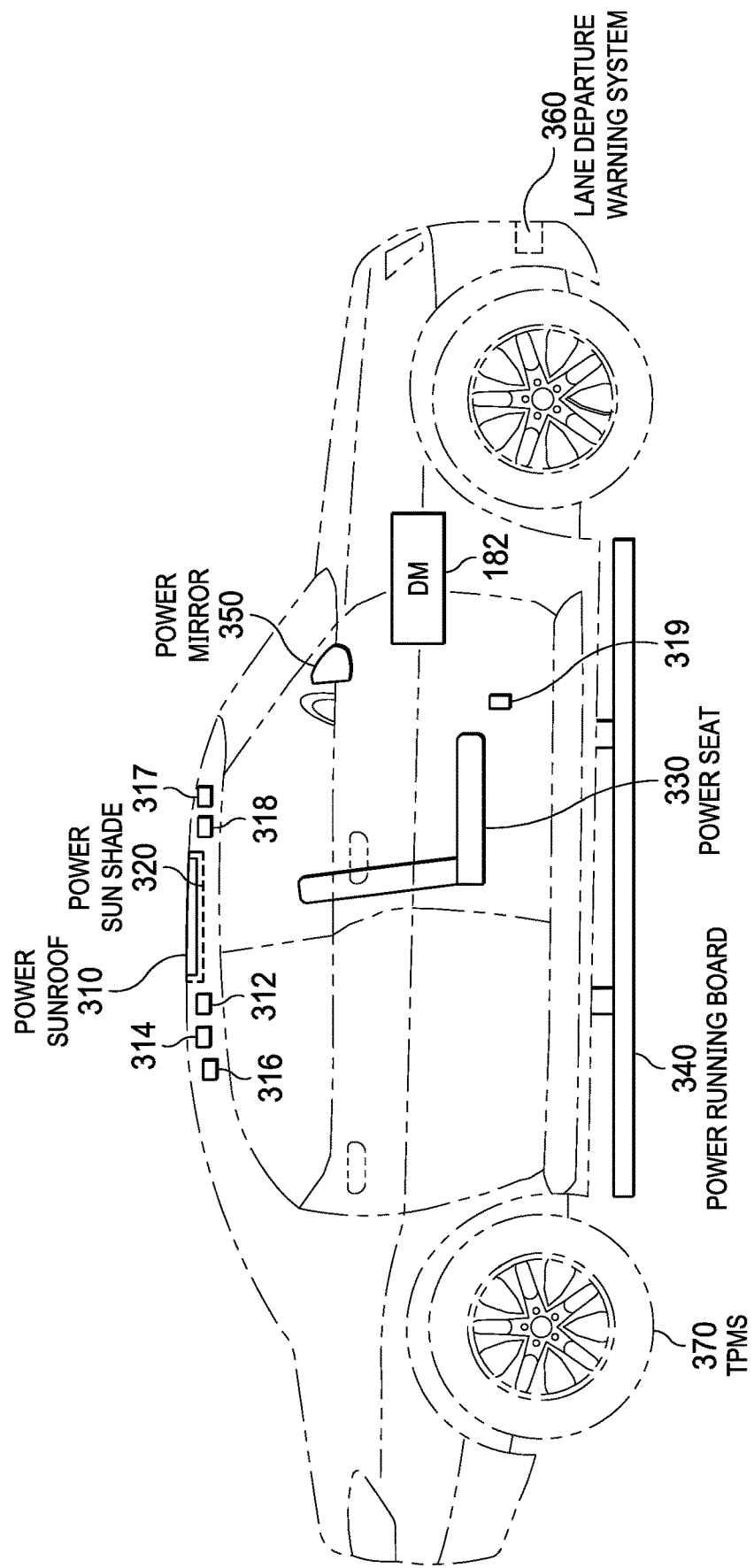
FIG. 3 is a diagrammatic illustration of an example vehicle including electronic and electromechanical accessories, components, and subsystems, in accordance with at least one embodiment of the present disclosure.

FIG. 3 is a diagrammatic illustration of an example vehicle 105 including electronic, software, and electromechanical accessories, components, and subsystems in accordance with at least one embodiment of the present disclosure. In the example shown in the figure, the vehicle 105 includes a power sunroof 310, power sun shade 320, power seat 330, power running board 340, power mirror 350, lane departure warning system (LDWS) 360, and Tire Pressure Monitoring System (TPMS) 370.

Electromechanical accessories like the power sunroof 310 may include additional subcomponents such as an accessory motor or actuator 312, position encoder 314, accessory electronic control unit (ECU) 316, and switch 318. In some instances, failures in an electromechanical accessory may be mechanical in nature (e.g., a broken motor 312), or electronic (e.g., a shorted ECU 316), or electrical (e.g., a blown fuse), in which case, physical replacement of the failed components may be the only way to restore the accessory to an operational state. In other instances, failure of the component may involve software or firmware in a safe mode, maintenance mode, or hang state.

Other subsystems, such as the LDWS 360 and TPMS 370, comprise one or more physical sensors (indicated in the figure), but may operate largely as software (e.g., operating in the VCU 110 or in an ECU 316). Failures in such components may involve a physical failure of the sensor, or may involve may involve software or firmware in a safe mode, maintenance mode, or hang state. For example, TMPS sensors 370 may report an error when a tire is replaced, even if the replacement tire is at normal operating pressure. Resetting the sensor 370 may clear this error condition.

Some vehicle accessories, components, or subsystems (e.g., a power sunroof) may include a dedicated ECU. In other cases, a single ECU may control multiple accessories, components, or subsystems (e.g., a body ECU may control lights, door locks, and other functions).

System reset or re-calibration is a common solution for fault-based errors relating to electronic or electromechanical components. However, identifying this is as a solution is not always clear to an end user or vehicle owner. The user may then have to take the vehicle to a service station to check the switch, motor, electrical connections, etc. only to find out that the best solution was simply to reset or recalibrate the component.

For example, attempting to open the power sunroof when frozen or when an obstruction is present causes the system to time out and enter an inoperable state, to prevent excessive stall current from damaging electronics or electromechanical actuators. However, this can be corrected simply by recalibrating the sunroof, which is a very simple procedure: turning the ignition key ON and pressing the sunroof button for 20 seconds. When this is done, the sunroof returns back to a home position, and the controls are reinstated. However, the user does not necessarily know that the components needs to be recalibrated or reset, or that such resetting or recalibration is a likely or even a possible solution to restore the inoperable component to an operable state. In some embodiments, to improve the user experience and streamline diagnostic procedures, the staged diagnostic system identifies when a simple reset or recalibration is likely the solution, thus drawing unnecessary attention away from electronic and mechanical subcomponents.

In some embodiments, the staged diagnostic system receives an input from the user (e.g. via voice, virtual agent, or touch input), which identifies a problem. If more information is required, the system may ask questions of the user or ask the user to perform specific tasks (e.g., actuating a switch, or verifying the position, movement, or other state of a vehicle component) until the provided information describes or isolates the problem sufficiently that the system has identified a probable root cause and probable corrective action, and then verified that the corrective action has succeeded. In some instances, if the system is not able to resolve the problem, it may help further isolate a root cause of the problem and thus narrow the list of possible remedies. In some embodiments, the staged diagnostic system asks the user to confirm whether the power component is functioning properly. If not, the system will continue asking questions or recommending actions relating to the diagnosis. In other embodiments, the system automatically detects whether the component is working (e.g., by reading a position encoder to confirm that an actuator is moving).

The process continues until the problem is resolved. In instances where the root cause of a problem is mechanical or electrical in nature and cannot be completely resolved by the user, the staged diagnostic system may recommend service options to the user for having the vehicle professionally serviced.

The staged diagnostic system of the present disclosure provides a simple, convenient, and cost-effective method to aid in the resolution of problems that occur when a power system (e.g., power running boards, power windows, sunroof, power extend mirrors, auto fold side view mirrors, power seats, power sun shades, etc.) ceases to operate due to a detected fault or system malfunction, or when an electronic subsystem enters a hang state or exception state.

In some embodiments, the staged diagnostic system begins troubleshooting the problem by asking a series of questions. This may start with questions directly relating to the onset of the problem. In other instances, the system begins troubleshooting by reading sensor values internal to the vehicle. If the answers suggest that a system reset or re-calibration will be helpful, either in resolving the issue or in further isolating a fault, the staged diagnostic system may recommend the steps required to reset or re-calibrate one or more components of the vehicle.

In some instances, the staged diagnostic system may guide the user through calibration or reset of a sensor (e.g., a tire pressure monitoring system or TPMS sensor), or actuator (e.g., a window, sunroof, or sun shade motor) that is part of a malfunctioning subsystem. In other instances, the staged diagnostic system may calibrate or reset an electronic control unit (ECU) that is part of or local to the malfunctioning component or subsystem. In still other instances, the staged diagnostic system may reset the entire vehicle (e.g., by resetting a Vehicle Control Unit or VCU 110).

In instances where user interaction is employed, the user may provide problem descriptions and answer questions through voice interaction, touchscreen, or any combination of audio, visual, gesture, selectable image, or virtual agent interaction. In some embodiments, diagnostic procedures are selected from a plurality of diagnostic procedures stored in an onboard database (for example, a database stored in the memory 170 of the VCU 110), or in a remote database accessed through a wireless network, server connection, or cloud storage device (e.g., on the remote server or central server 125).

Figure 4B:
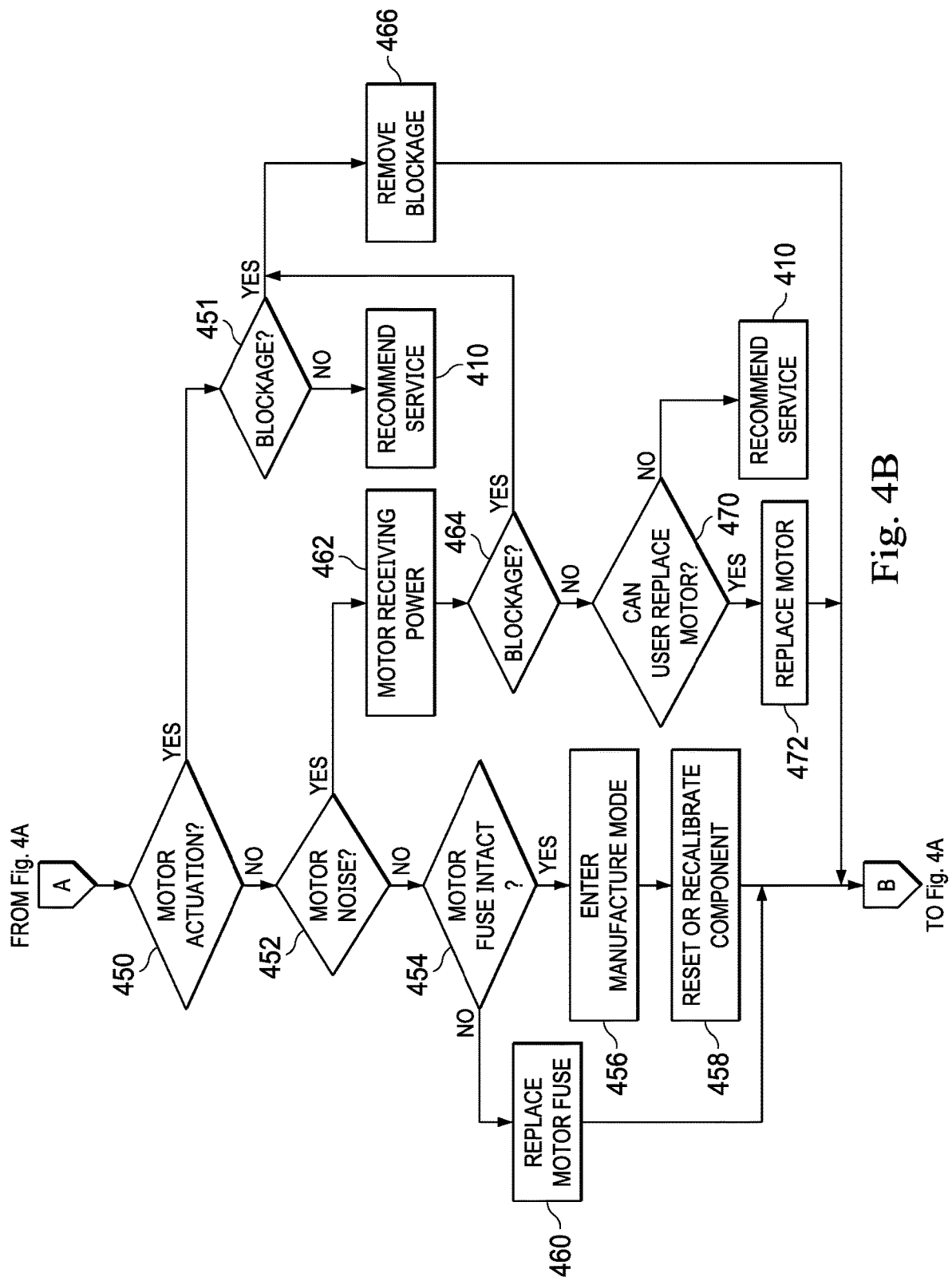

FIGS. 4A and 4B are flow diagrams showing exemplary process steps undertaken by a method performed by the staged diagnostic system 100 according to at least one embodiment of the present disclosure. The diagnostic system or method employs branching logic steps to determine performance parameters related to a malfunctioning or apparently malfunctioning component (e.g., a power sunroof 310) by interacting with the user (via the user interface), in order to isolate, diagnose, and if possible guide user actions (e.g., activating controls, physical examination or replacement of subcomponents), to repair the root cause of the component malfunction (e.g., a blown fuse or an actuator in safe mode). The branching logic steps may move the method performed by the system 100 through different sections of a fault tree or diagnostic procedure associated with the malfunctioning component.

When the user performs a visual inspection, the user may enter a response, such as yes (component working), or no (component not working) at the user interface. When automatically checked, the diagnostic module 182 receives the response from the sensing component, ECU, or VCU. For clarity, these inputs (from the user or automatically from components of the diagnostic system) are not always reiterated through the example process described with reference to FIG. 4, yet they may be present whenever feedback is required. It is worth noting that the diagnostic module 182 may perform the steps described via the user interface. Accordingly, user interface instructions may be based on processing of information and execution of the processes at the diagnostic module 182.

In an example, the method begins with step 402, in which a determination is made as to whether there is a nonworking component. In some embodiments, this determination is accepted as an input from the user via the user interface. For example, the user might activate a user interface (e.g., via the interface engine 155 or portable device 300, under control of the diagnostic module 182) and select a menu option indicating that the vehicle sunroof 310 is not working. In other embodiments, this determination is made based on a sensor reading or self-test function. For example, if a user actuates a sunroof motor 312, and an error code is generated by an ECU 316 or VCU 110, or readings from an encoder 314 indicate that the sunroof did not move, then the staged diagnostic system 100 may conclude that a problem exists either with the motor 312, the encoder 314, the ECU 316, or the switch 318, or else with supporting electronics such as a wire or fuse.

If a nonworking component is not present, the system 100 branches to endpoint step 420, which is normal operation of the vehicle. If a nonworking component is present, the system 100 branches to step 404, wherein the system 100 instructs the user to press a control switch (e.g., the sunroof control switch 318) or other control input related to the malfunctioning component. The system or method then proceeds to step 406, wherein the diagnostic module (DM) 182 determines whether an ECU or VCU associated with, or downstream of, the activated switch or control (e.g., the sunroof ECU 316) received a signal from the activated switch or control. If the answer is no, the system 100 then branches to step 408, where it is determined that the problem lies with either the ECU, the switch or switch wiring, or other electrical pathways or systems upstream of the switch and ECU. Execution then proceeds to endpoint step 410 where the system uses the user interface to recommend service options to the user (e.g., recommending that the user bring the vehicle to an authorized service station).

If the answer at 406 is yes (i.e., a signal was received at the ECU, e.g., the sunroof ECU 316), then execution branches to step 412, where the DM 182 determines that the ECU, switch, switch wiring, and upstream systems are operating correctly. Next, the system proceeds to step 416, where the user interface (e.g., via the interface engine 155 or portable device 300, under control of the diagnostic module 182) instructs the user to press a virtual switch on the display 290 or handheld device 300. Execution then proceeds to step 418, where this input prompts the ECU (e.g., the sunroof ECU 318) to send a downstream message (e.g., to the VCU 110 or other downstream processing component). Execution then proceeds to step 430, wherein the DM 182 determined whether the downstream message was received. If the answer at 430 is yes (i.e., the message was received), then execution proceeds to step 432, where the DM 182 determines that components and electrical pathways downstream of the ECU (e.g., ECU 318) are working normally. At this point, the system will proceed again to step 410, where the user interface recommends to the user that the vehicle be professionally serviced.

If the answer at 430 is no (i.e., the downstream message or signal was not received), then execution branches to step 436, where the user is asked (via the user interface) whether a relay 317 associated with the power component is clicking when the activation switch (e.g., switch 318) is pressed. If the answer at 436 is no (i.e., the relay is not clicking), execution branches to step 438, where the DM 182 determines that no power is present to the power component. Execution then proceeds to step 440, where the user is instructed (via the user interface) to check a fuse 319 associated with the relay 317, to see whether it is intact. This may be done by instructing the user to locate, remove, and visually inspect the fuse. If the answer at 440 is yes (i.e., the fuse is intact), then execution again branches to step 410 where the user interface (e.g., via the interface engine 155 or portable device 300, under control of the diagnostic module 182) recommends to the user that the vehicle be professionally serviced. Alternatively, if the answer at 440 is no (i.e., the fuse is not intact), then execution proceeds to step 442, where the user interface instructs the user to replace the fuse and retest the power component. Execution then returns to step 402, described above.

If the answer at 436 is yes (i.e., the relay 317 is clicking), then execution branches to step 450 where the user interface asks the user to determine whether the motor (e.g., motor 312) is actuating at all. If the answer at 450 is yes (i.e., the motor is actuating), then execution branches to step 451, where the user interface directs the user to determine whether there is blockage (e.g., ice, dirt) preventing the component from moving properly. If the answer at 451 is no, then execution branches to step 410, where the user interface recommends to the user that the vehicle be professionally serviced. If the answer at 451 is yes (i.e., blockage is present), then execution branches to step 466, where the user interface instructs the user to remove the blockage and retest the component. Execution then returns to step 402.

If the answer at 450 is no (i.e., the motor is not actuating at all), then execution branches to step 452, where the user interface (e.g., via the interface engine 155 or portable device 300, under control of the diagnostic module 182) asks the user to determine whether the motor is making noise. If the answer at 452 is yes (i.e., the motor is making noise), then execution branches to step 462, where the DM 182 determines that the motor is receiving power. Execution then proceeds to step 464, described above. If the answer at 452 is no (i.e., the motor is not making noise), then execution branches to step 454, wherein the user interface directs the user to check a fuse 319 associated with the motor (e.g., motor 312) to see whether it is intact. If the answer is no (i.e., the fuse is not intact), then execution branches to step 460, wherein the user interface instructs the user to replace the motor fuse 319 and retest the component. Execution then returns to step 402, described above. It is noted that in many vehicles, the fuses 319 for the motor and relay may be the same fuse.

If the at 454 is yes (i.e., the motor fuse is intact), then execution branches to step 456, wherein the user interface (e.g., via the interface engine 155 or portable device 300, under control of the diagnostic module 182) directs the user to enter "manufacturer's mode", wherein it is possible to reset or recalibrate vehicle components. From there, execution proceeds to step 458, wherein the user interface directs the user to perform a recalibration and/or reset of the power component, and then retest the component. After this, execution returns to step 402, described above.

If the answer at 464 is no (i.e., there is no blockage present), then execution branches to step 470 in which the user interface asks the user whether he or she is capable of replacing the motor. If the answer at 470 is no, then execution branches to step 410, wherein the user is advised (via the user interface) to have the vehicle professionally serviced. If the answer is yes, execution branches to step 472, wherein the user interface instructs the user to replace the motor and retest the component. Execution then proceeds to step 402 as described above.

These steps describe a particular diagnostic procedure of a particular embodiment of the staged diagnostic system 100 of the present disclosure. A reader of ordinary skill in the art will understand that the system 100 may employ diagnostic procedures comprising additional steps not described above, or may omit one or more of the described steps, or may perform one or more steps in a different sequence than described above, while remaining within the spirit, function, and advantages of the present disclosure. In particular, delay and trigger steps may be incorporated such that, for example, if a sunroof ceases operating due to ice, then a user may be advised to wait until the ice has melted to attempt any further troubleshooting or repair. It is noted that some embodiments may include advantageous arrangements wherein user action is solicited only when autonomous interventions for a given problem have been attempted and have not been successful.

It is further noted that in some embodiments the system may include interfaces to mapping and scheduling functions external to the vehicle, such when the system advises a user to have the vehicle professionally serviced, the system may be capable of identifying an appropriate service station (either autonomously or guided by user inputs), scheduling a service appointment that fits within the schedules of both the user and the service station, sending a detailed writeup of the problem to the service station (e.g., identity of the nonworking component and all steps taken to isolate, diagnose, or repair it.), and sending an automated calendar invitation to the user. Such embodiments are fully contemplated.

It is further noted that in some embodiments the staged diagnostic system 100 issues service instructions to the user through an augmented reality (AR) device providing AR instructions, wherein for example the locations of vehicle subcomponents (e.g., motors and relays), or the proper method for operating vehicle components (e.g., switches), or the proper methods for removing and replacing vehicle subcomponents (e.g., fuses) may be shown as virtual animation overlaid on top of live video. This may be done for example through the screen of a smartphone or tablet, or through an AR-capable headset.

Figure 5:
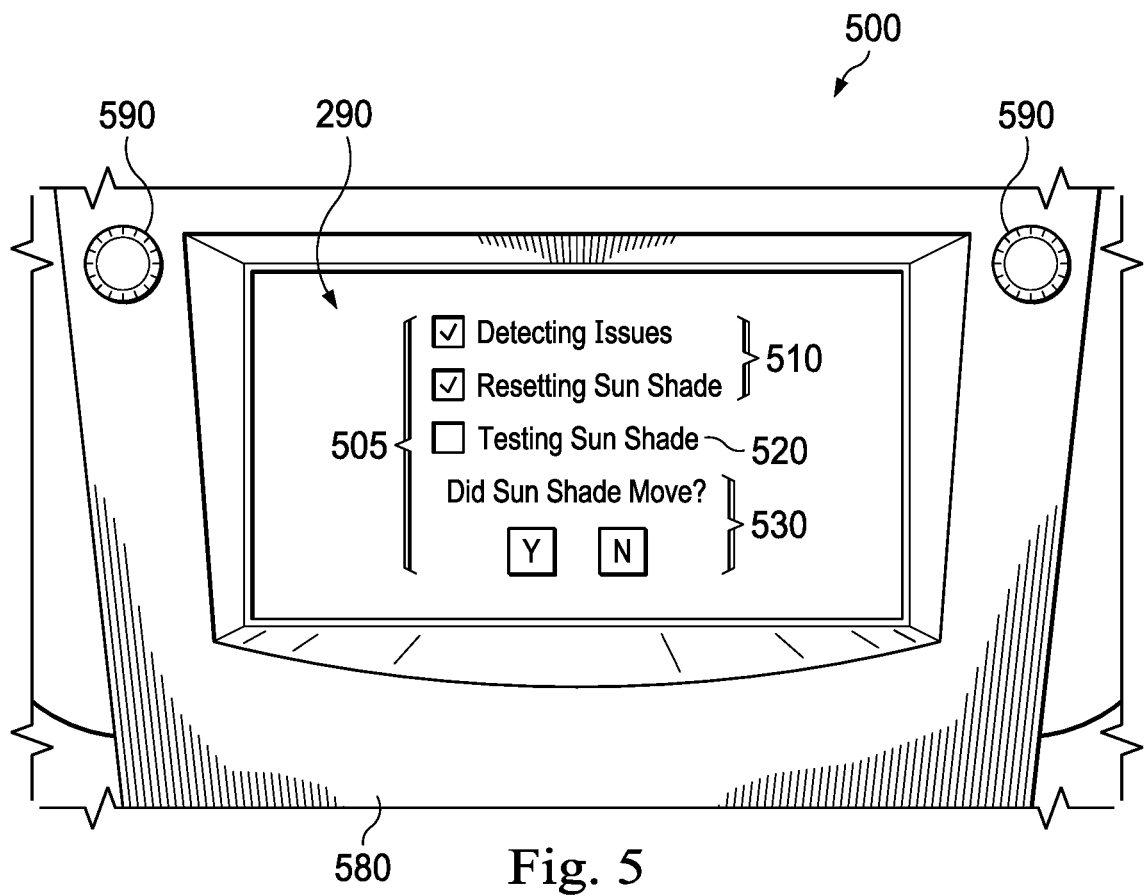
FIG. 5 is a diagrammatic illustration of an example user interrogation display according to at least one embodiment of the present disclosure.

FIG. 5 is a diagrammatic illustration of an example user interrogation display or Human Machine Interface (HMI) 500 according to at least one embodiment of the present disclosure. The HMI 500 may be interactive, and may be facilitated for example through the dashboard Head Unit (HU) 580 or through a connected smartphone using an application program interface API. In the example shown in the figure, the HMI 500 includes a text-based user interface 505 on the display unit 290 of the head unit 580. Also visible are control knobs 590. In some embodiments, the HMI 500 is part of, the same element as, or in communication with, the interface engine 155.

In the example shown in the figure, the text-based interface 505 includes a report of completed steps 510 that the staged diagnostic system has executed, and uncompleted steps 520 that the staged diagnostic system has not yet executed or is currently executing. In some embodiments, such reports of completed and uncompleted steps enable the staged diagnostic system to inform the user about the status of the staged diagnostic system during a fault correction procedure. The text-based interface 505 also includes a user query 530 that poses a question to the user and allows the user to respond. In some embodiments, such user queries enable the staged diagnostic system to acquire information from the user that may not be available from sensors internal to the vehicle. In some embodiments, such user queries 530 are limited to yes-or-no questions such as "Did the sunroof move?", "Did the sunroof make a noise?", or "Is the temperature of the sunroof below freezing?". In other embodiments, user queries 530 may solicit numerical information from the user such as ambient temperature. In still other embodiments, user queries may solicit more complex information to be interpreted by a virtual agent.

A person of ordinary skill in the art will appreciate that a variety of different user interfaces and user interface types may be employed to provide information to the user, to request information from the user, and to receive information from the user. It is also noted that in many examples no user interaction is required in order to detect and resolve a problem with a vehicle accessory, component, or subsystem. In some embodiments, the staged diagnostic system provides a seamless interaction between the user and the vehicle through the HU 580 or connected device 300 wherein the required user action is conveniently limited to describing the problem and verifying that the problem has been resolved.

Figure 6:
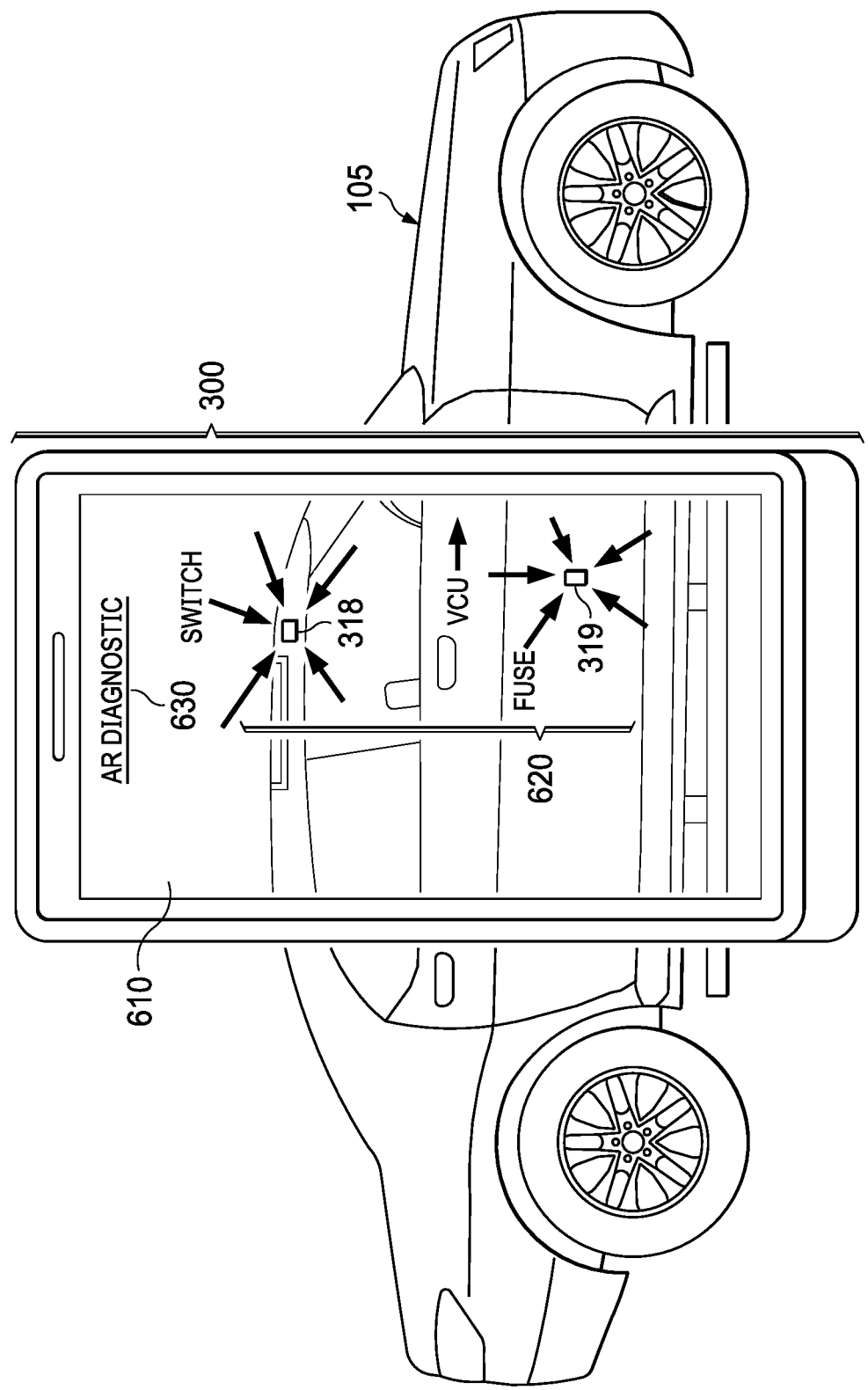
FIG. 6 is a diagrammatic view of an example augmented reality display on a portable device in accordance with at least one embodiment of the present disclosure.

FIG. 6 is a diagrammatic view of an example augmented reality display 610 on a portable device 300 such as a smartphone or tablet device in accordance with at least one embodiment of the present disclosure. When the vehicle 105 is viewed through the augmented reality display 610, certain features or subcomponents (e.g., a switch 318 and fuse 319) related to a selected diagnostic procedure are highlighted with animated overlays 620 visible only on the display 610. The animated overlays 620 may show the positions of the subcomponents, in such a way that when the portable device 300 is moved or reoriented, the animated overlays 620 appear to hold as fixed position in real 3D space. The AR display 610 may also include fixed overlays 630 that appear to hold a constant or nearly constant position on the portable device 300, regardless of the position or orientation of the portable device 300.

Both the animated overlays 620 and fixed overlays 630 may provide graphics, symbols, text, icons, flashing or scrolling indicators, including visual, textual, auditory, or graphical instructions on how to interact with the subcomponents (e.g., 318 and 319).

A number of variations are possible on the examples and embodiments described above. For example, the display 290 could be replaced or supplemented with audible warnings, messages, flashing lights or indicators, data, and recommendations, or with haptic feedback (e.g., vibration of the portable device 300). The technology described herein may be implemented on manually controlled vehicles, driver-assist vehicles, or fully autonomous vehicles. The technology described herein may be implemented in diverse combinations of hardware, software, and firmware, depending on the implementation or as necessitated by the structures and modules already present in existing vehicles.

Accordingly, the logical operations making up the embodiments of the technology described herein may be referred to variously as operations, steps, objects, elements, components, or modules. Furthermore, it should be understood that these may be arranged in any order, unless explicitly claimed otherwise or a specific order is inherently necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the staged diagnostic system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the staged diagnostic system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, additional sensors such as light sensors, vibration sensors, accelerometers, current sensors, or voltage sensors may be provided to help detect failed components, diagnose failure types, and confirm operational status of vehicle accessories, components, or subsystems. Additionally, sensors external to the vehicle may be employed to provide or supplement any of the sensor data described hereinabove, and processors external to the vehicle may be employed to provide or supplement any of the control processic steps described hereinabove. Alternatively, machine learning control process or other AI systems may be used to estimate variables from sparse, noisy, or entwined data streams without departing from the spirit of the present disclosure. The principles described above can be equally applied to electric vehicles, internal combustion vehicles, hybrid vehicles, autonomous and driver-assist vehicles, consumer vehicles, commercial vehicles, and mixed-use vehicles.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A vehicle comprising an automotive staged diagnostic system, the system comprising:
   one or more components of the vehicle;
   a user interface; and
   a diagnostic module disposed within the vehicle and comprising a processor and a non-transitory memory, wherein the diagnostic module is configured to:
      electronically receive a signal identifying at least one malfunctioning component of the one or more components of the vehicle;
      from a database stored within the non-transitory memory and comprising a plurality of diagnostic procedures, automatically identify a diagnostic procedure for the at least one malfunctioning component;
      initiate the identified diagnostic procedure;
      execute one or more steps of the diagnostic procedure by:
         soliciting information from a user via the user interface,
         issuing instructions to the user via the user interface,
         executing branching logic steps,
         automatically triggering a message to be sent through electrical pathways associated with the at least one malfunctioning component, and either:

receiving the message, or determining that the message was not received;

initiate automatic reset or calibration of the at least one malfunctioning component based on at least one of the receiving step, the determining step, or a user action received via the user interface;

issue instructions for manual replacement of the at least one malfunctioning component if the automatic reset or calibration is unable to return the at least one malfunctioning component to working order; and recommend service options via the user interface to the user if the diagnostic procedure is unable to return the at least one malfunctioning component to working order.

2. The vehicle of claim 1, wherein soliciting information from the user or issuing instructions to the user involves a voice interface.

3. The vehicle of claim 1, wherein soliciting information from the user or issuing instructions to the user involves a visual interface.

4. The vehicle of claim 1, wherein soliciting information from the user or issuing instructions to the user involves a dashboard head unit.

5. The vehicle of claim 1, wherein soliciting information from the user or issuing instructions to the user involves a portable device.

6. The vehicle of claim 5, wherein the portable device comprises an augmented reality device and the instructions to the user comprise augmented reality instructions.

7. The vehicle of claim 1, wherein the at least one malfunctioning component comprises an electromechanical component.

8. The vehicle of claim 1, wherein the at least one malfunctioning component comprises an electronic component.

9. The vehicle of claim 1, wherein the instructions to the user comprise instructions for activating controls within the vehicle.

10. The vehicle of claim 1, wherein the instructions to the user comprise instructions for activating controls within the automotive staged diagnostic system.

11. The vehicle of claim 1, wherein the instructions to the user comprise instructions for physical examination of vehicle subcomponents.

12. The vehicle of claim 1, wherein the instructions to the user comprise instructions for physical replacement of vehicle subcomponents.

13. A method for repairing malfunctioning automotive components, the method comprising:

in a processor disposed within a vehicle, performing steps comprising:

receiving a status of at least one malfunctioning component of one or more vehicle components by receiving a signal from a user via a user interface;

identifying a diagnostic procedure stored in a non-transitory memory of the processor from a plurality of diagnostic procedures stored in the non-transitory memory, wherein the diagnostic procedure relates to the at least one malfunctioning component;

automatically executing branching logic steps of the identified diagnostic procedure for the at least one malfunctioning component;

soliciting information from the user about the at least one malfunctioning component via the user interface;

automatically issuing instructions to the user regarding the at least one malfunctioning component via the user interface;

automatically triggering a message to be sent through electrical pathways associated with the at least one malfunctioning component, and either:

receiving the message, or determining that the message was not received;

initiating automatic reset or calibration of the at least one malfunctioning component; and if, at an endpoint of the diagnostic procedure, the at least one malfunctioning component continues to malfunction, recommending service options to the user.

14. The method of claim 13, wherein soliciting information from or issuing instructions to the user involves a voice interface.

15. The method of claim 13, wherein soliciting information from the user or issuing instructions to the user involves a visual interface.

16. The method of claim 13, wherein soliciting information from the user or issuing instructions to the user involves a dashboard head unit.

17. The method of claim 13, wherein soliciting information from the user or issuing instructions to the user involves a portable device.

18. The method of claim 17 wherein the portable device comprises an augmented reality device.

19. The method of claim 13, wherein the at least one malfunctioning component comprises an electronic or electromechanical component.

20. A vehicle staged diagnostic module comprising:

a user interface; and a processor comprising a non-transitory memory and configured to:

receive a signal indicative of a status of a malfunctioning component of a vehicle;

automatically identify a diagnostic procedure for the malfunctioning component from a database stored within the non-transitory memory and comprising a plurality of diagnostic procedures and initiate the identified diagnostic procedure;

execute branched logic paths of the identified diagnostic procedure;

solicit information from a user via the user interface regarding the malfunctioning component;

issue instructions to the user regarding the malfunctioning component via the user interface;

automatically trigger a message to be sent through electrical pathways upstream or downstream of the malfunctioning component, and either:

receive the message, or determine that the message was not received;

initiate automatic reset or calibration of the malfunctioning component based on at least one of the receiving step, the determining step, or a user action received at the user interface; and recommend service options to the user via the user interface if an endpoint of the identified diagnostic procedure indicates a continued malfunction status of at least one component of the at least one malfunctioning component.

* * * * *